US012717975B2

(12) United States Patent
Kang et al.

(10) Patent No.: US 12,717,975 B2
(45) Date of Patent: Aug. 25, 2026

(54) SYSTEM-ON-CHIP AND ELECTRONIC DEVICE INCLUDING THE SAME

(71) Applicant: SAMSUNG ELECTRONICS CO., LTD., Suwon-si (KR)

(72) Inventors: Bogyeong Kang, Suwon-si (KR); Kihong Kim, Suwon-si (KR); Junyoung Park, Suwon-si (KR); Jinsub Park, Suwon-si (KR); Jaekeun Oh, Suwon-si (KR); Youngjae Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 18/219,955

(22) Filed: Jul. 10, 2023

(65) Prior Publication Data

US 2024/0012950 A1 Jan. 11, 2024

(30) Foreign Application Priority Data

Jul. 11, 2022 (KR) ........................ 10-2022-0085279
Aug. 12, 2022 (KR) ........................ 10-2022-0101593
Oct. 14, 2022 (KR) ........................ 10-2022-0132723

(51) Int. Cl.
*G06F 21/79* (2013.01)
*G06F 21/60* (2013.01)
*H04L 9/08* (2006.01)

(52) U.S. Cl.
CPC ............ *G06F 21/79* (2013.01); *G06F 21/602* (2013.01); *H04L 9/0819* (2013.01)

(58) Field of Classification Search
CPC .... G06F 21/79; G06F 21/602; G06F 11/1004; G06F 21/606; G06F 21/6218;
(Continued)

(56) References Cited

U.S. PATENT DOCUMENTS 4,347,603 A 8/1982 Jacob et al.
5,729,004 A 3/1998 Kim et al.
(Continued)

FOREIGN PATENT DOCUMENTS

FR 2 868 577 A1 10/2005
JP 6-177941 A 6/1994

OTHER PUBLICATIONS

Communication issued Mar. 5, 2024 by the European Patent Office in European Patent Application No. 23184330.1.
(Continued)

*Primary Examiner* — Lynn D Feild
*Assistant Examiner* — Ethan V Vo
(74) *Attorney, Agent, or Firm* — Sughrue Mion, PLLC

(57) ABSTRACT

Provided is a system-on-chip including a host central processing unit (CPU) and a secure element, wherein the secure element includes a primary device configured to transmit encrypted data, an internal bus configured to transmit the encrypted data, a plurality of secondary devices configured to receive the encrypted data, and a secure CPU configured to manage access keys indicating authorization of the primary device for accessing the plurality of secondary devices, and the internal bus sets a secondary device to which the encrypted data is to be transmitted from among the plurality of secondary devices, based on the access key and transmits the encrypted data to a set secondary device by using an error detection tag.

20 Claims, 11 Drawing Sheets

(58) Field of Classification Search
CPC .......... G06F 21/64; G06F 21/76; G06F 21/87; G06F 21/71; H04L 9/0819
See application file for complete search history.

(56) References Cited

U.S. PATENT DOCUMENTS

| | | | | |
|---|---|---|---|---|
| 7,330,979 | B1 | 2/2008 | Hazard | |
| 7,889,778 | B2 | 2/2011 | Marinet et al. | |
| 9,960,981 | B2 | 5/2018 | Takahashi et al. | |
| 10,127,405 | B2 | 11/2018 | Le Roy et al. | |
| 11,023,408 | B2 | 6/2021 | Pitigoi-Aron et al. | |
| 11,294,846 | B2 | 4/2022 | Srivastava et al. | |
| 11,321,459 | B2 | 5/2022 | Shen et al. | |
| 2005/0283826 | A1* | 12/2005 | Tahan | G06F 21/575 726/2 |
| 2006/0233360 | A1 | 10/2006 | Gammel et al. | |
| 2013/0275646 | A1 | 10/2013 | Kawasaki et al. | |
| 2014/0020114 | A1 | 1/2014 | Bhatia et al. | |
| 2015/0312036 | A1 | 10/2015 | Kumar | |
| 2016/0026824 | A1* | 1/2016 | Hars | G06F 21/78 726/26 |
| 2018/0034793 | A1* | 2/2018 | Kibalo | G06F 21/575 |
| 2018/0082065 | A1* | 3/2018 | Liu | H04L 9/3247 |
| 2018/0095897 | A1* | 4/2018 | Upasani | G06F 21/6218 |
| 2019/0132118 | A1* | 5/2019 | Ghosh | G06F 12/1408 |
| 2019/0172047 | A1* | 6/2019 | Tan | H04W 4/80 |
| 2019/0196967 | A1* | 6/2019 | Choi | G06F 21/85 |
| 2019/0227784 | A1 | 7/2019 | De Atley et al. | |
| 2020/0117814 | A1 | 4/2020 | Ito et al. | |
| 2020/0293667 | A1 | 9/2020 | Kim et al. | |
| 2021/0312091 | A1* | 10/2021 | Dafali | G06F 21/72 |
| 2021/0336767 | A1* | 10/2021 | Makaram | H04L 9/0631 |
| 2021/0397716 | A1* | 12/2021 | Kovah | H04L 9/3263 |
| 2022/0019701 | A1* | 1/2022 | Yang | G06F 21/755 |
| 2022/0035901 | A1* | 2/2022 | Yun | G06F 3/0679 |
| 2022/0050605 | A1* | 2/2022 | Gremaud | G06F 3/0655 |

OTHER PUBLICATIONS

Grand, Michael et al., "A Reconfigurable Multi-core Cryptoprocessor for Multi-channel Communication Systems", 2011 IEEE International Parallel & Distributed Processing Symposium, May 16, 2011, pp. 204-211, AP031934679. (8 pages total).

Guerrier, Pierre et al., "A Generic Architecture for On-Chip Packet-Switched Interconnections", Design, Automation and Test in Europe, ACM, Jan. 1, 2000, pp. 250-256, XP058267936. (7 pages total).

Patel, Ketan N. et al., "Error-Correction and Crosstalk Avoidance in DSM Busses", IEEE Transactions on Very Large Scale Integration (VLSI) Systems, IEEE Service Center, vol. 12, No. 10, Oct. 1, 2004, pp. 1076-1080, XP011118968. (5 pages total).

Communication issued Oct. 27, 2023 by the European Patent Office in European Patent Application No. 23184330.1.

* cited by examiner

SYSTEM-ON-CHIP AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2022-0085279, filed on Jul. 11, 2022, Korean Patent Application No. 10-2022-0101593, filed on Aug. 12, 2022, and Korean Patent Application No. 10-2022-0132723, filed on Oct. 14, 2022, in the Korean Intellectual Property Office, the disclosures of which are incorporated by reference herein in their entirety.

BACKGROUND

1. Field

The disclosure relates to a system-on-chip, and more particularly, to a system-on-chip including a secure element with enhanced security performance.

2. Description of Related Art

A system-on-chip may refer to a single chip in which systems performing various operations are integrated. A system-on-chip may communicate with an external device, such as a memory device, and perform one or more operations.

A system-on-chip may store and use information, such as a password and personal information about a user that needs to be kept secure. Therefore, researches to further develop the security function of a system-on-chip are being actively conducted. One of the techniques of developing the security function of a system-on-chip includes a secure element, which provides a security function and a secure storage place, inside a system-on-chip is being studied.

SUMMARY

One or more aspects of the disclosure provides a system-on-chip including a secure element with enhanced security functions.

According to an aspect of the disclosure, there is provided a system-on-chip including: a host central processing unit (CPU); and a secure element including: a primary device configured to transmit encrypted data through an internal bus, a plurality of secondary devices configured to receive the encrypted data; a secure CPU configured to manage one or more access keys for accessing the plurality of secondary devices, and the internal bus configured to: select, based on an access key, among the one or more access keys, a first secondary device, among the plurality of secondary devices, to which the encrypted data is to be transmitted, and transmit to the first secondary device the encrypted data and an error detection tag.

The primary device may include a memory encryption engine (MEE) configured to generate the encrypted data by encrypting general data.

The internal bus may include: a bus permission switch configured to select the first secondary device based on the access key; a tag generator configured to generate the error detection tag and attach the error detection tag to the encrypted data; an interconnect configured to transmit the encrypted data attached with the error detection tag; and a tag checker configured to determine whether the encrypted data attached with the error detection tag is abnormal.

The tag generator may be further configured to generate the error detection tag based on a type of the encrypted data.

The tag checker may be further configured to: transmit the encrypted data to the first secondary device based on a determination that there is no abnormality in the encrypted data attached with the error detection tag, and output an abnormality alarm to the host CPU based on a determination that an abnormality has occurred in the encrypted data attached with the error detection tag.

The host CPU may be configured to stop an operation of the secure element based on receiving the abnormality alarm.

The error detection tag may include at least one of a parity bit, a cyclic redundancy check (CRC), and an error correction code (ECC).

The first secondary device may include a scramble circuit configured to set, based on address scrambling, an address where the encrypted data is to be stored.

According to an aspect of the disclosure, there is provided a system-on-chip including: a host central processing unit (CPU); and a secure element including: an encryption circuit configured to generate encryption keys; a secure CPU configured to generate encrypted data by encrypting general data using the encryption keys; an internal memory configured to store the encrypted data; an one-time programmable (OTP) memory configured to store one or more of the encryption keys and a unique identifier (UID) used in the secure element; an attack detection circuit configured to detect whether an external attack on the encrypted data has occurred; an internal bus configured to transmit the encrypted data and an error detection tag within the secure element; and an external bus configured to transmit the encrypted data outside the secure element.

The host CPU may include: a memory encryption engine (MEE) configured to generate the encrypted data by encrypting the general data.

The internal bus may include: a bus permission switch configured to select, based on an access key, a target device within the secure element to which the encrypted data is to be transmitted.

The internal bus may include: a tag generator configured to generate an error detection tag based on a type of the encrypted data and attach the error detection tag to the encrypted data; an interconnect configured to transmit the encrypted data attached with the error detection tag; and a tag checker configured to determine whether the encrypted data attached with the error detection tag is abnormal.

The tag checker may be further configured to: transmit the encrypted data to a target device based on a determination that there is no abnormality in the encrypted data attached with the error detection tag, and output an abnormality alarm to the host CPU based on a determination that an abnormality has occurred in the encrypted data attached with the error detection tag.

The internal memory may include: a scramble circuit configured to set, based on address scrambling, an address where the encrypted data is to be stored.

The encryption circuit may include: a random number generator configured to generate random numbers for generating the encryption keys; and an encryption key management circuit configured to generate a first encryption key based on a first random number generated through the random number generator.

The attack detection circuit may include: a reference voltage generator configured to generate a reference voltage;

a temperature detector configured to detect an abnormal temperature based on the reference voltage; and a voltage detector configured to detect whether an externally supplied voltage is abnormal based on the reference voltage.

The attack detection circuit may include: a voltage regulator configured to generate an adjusted voltage for an operation of the secure element based on the reference voltage.

The attack detection circuit may include: a pattern generator configured to generate a random pattern based on a random number generated by the encryption circuit; and a pattern comparator configured to determine whether an external attack has occurred by comparing a first output of the random pattern received through a first layer and a second output of the random pattern received through a second layer.

The external bus may include: a rollback prevention circuit configured to detect whether data transmitted from the outside of the secure element is rolled back.

The secure element further may include: an oscillator configured to supply an independent system clock to the secure element.

According to an aspect of the disclosure, there is provided an electronic device including: a system-on-chip including: a host central processing unit (CPU), and a secure element; and an external memory configured to communicate encrypted data with the secure element, wherein the secure element is configured to: generate a first encryption tag based on general data and an encryption parameter, generate the encrypted data by attaching the first encryption tag to the general data, and transmit the encrypted data to the external memory, and wherein the external memory is further configured to store the encrypted data.

Based on receiving the encrypted data from the external memory, the secure element may be further configured to: obtain restored data by decrypting the encrypted data, generate a second encryption tag based on the restored data and the encryption parameter, and compare the first encryption tag and the second encryption tag to determine whether the restored data is abnormal.

The secure element may be further configured to: store the restored data in an internal memory based on the first encryption tag being identical to the second encryption tag, and output an abnormality alarm to the host CPU based on the first encryption tag being different to the second encryption tag.

BRIEF DESCRIPTION OF DRAWINGS

Embodiments of the disclosure will be more clearly understood from the following detailed description taken in conjunction with the accompanying drawings in which.

DETAILED DESCRIPTION

Hereinafter, various example embodiments of the disclosure will be explained in detail with reference to the accompanying drawings.

The various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1:
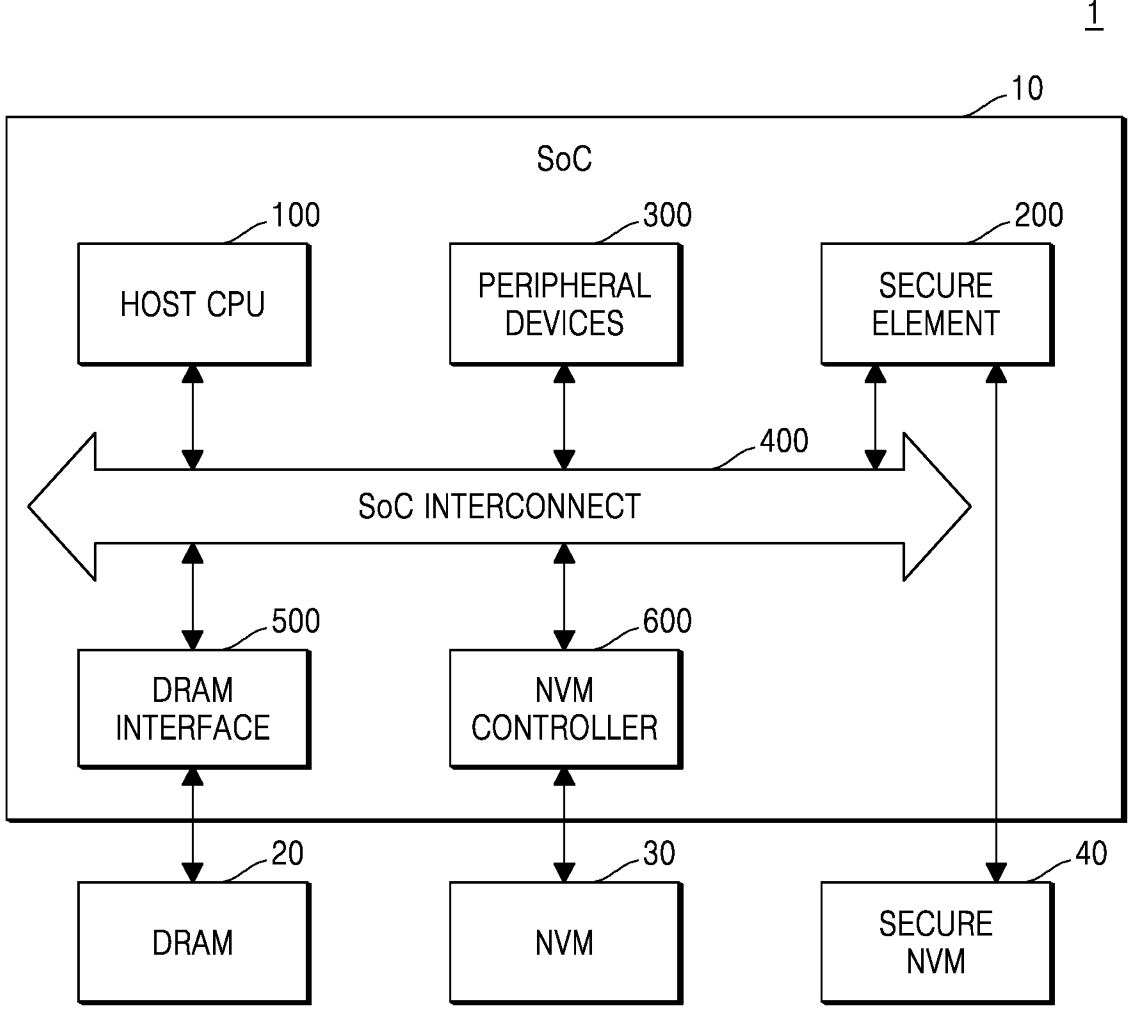
FIG. 1 is a block diagram showing an electronic device including a system-on-chip according to an example embodiment.

FIG. 1 is a block diagram showing an electronic device including a system-on-chip according to an example embodiment.

Referring to FIG. 1, according to an example embodiment, the electronic device 1 includes a system-on-chip 10, a dynamic random access memory (DRAM) 20, a non-volatile memory (NVM) 30, and a secure NVM 40.

According to an example embodiment, the electronic device 1 may be, but is not limited to, any one of a smartphone, a tablet PC, a smart TV, a mobile phone, a personal digital assistant (PDA), a laptop computer, a media player, a micro server, a global positioning system (GPS)

device, an e-book reader, a digital broadcasting terminal, a navigation device, a kiosk, an MP3 player, a digital camera, a home appliance, and other mobile or non-mobile computing devices. Also, the electronic device 1 may be a wearable device including, but not limited to, a watch, glasses, a hair band, and a ring having a data processing function. However, the disclosure is not limited thereto, and as such, according to various other example embodiments, the electronic device 1 may include all types of devices using a processor to operate based on an operating system (OS).

According to an example embodiment, the system-on-chip 10 controls overall operations of the electronic device 1. Moreover, the system-on-chip 10 may control one or more components included in the electronic device 1. The system-on-chip 10 executes an OS and application programs and may perform various calculations or data processing operations. The system-on-chip 10 may refer to a dedicated processor for performing specific operations or a general-purpose processor capable of performing corresponding operations by executing one or more software programs stored in a memory device. According to an example embodiment, the dedicated processor may be an embedded processor. For example, the system-on-chip 10 may be implemented as a central processing unit (CPU), a microprocessor, or a communication processor (CP). However, the disclosure is not limited thereto, and as such, the system-on-chip 10 may be implemented by other types of processor. According to an example embodiment, the system-on-chip 10 may include an area for performing general operations and an area for performing operations related to data processing related to security.

According to an example embodiment, the system-on-chip 10 may include a host CPU 100, a secure element 200, one or more peripheral devices 300, a system-on-chip (SoC) interconnect 400, a DRAM interface 500, and an NVM controller 600.

The host CPU 100 may control overall operations of the system-on-chip 10. The host CPU 100 may control operations of one or more devices included in the electronic device 1. According to an example embodiment, the host CPU 100 may control operations of the one or more devices included in the electronic device 1 by controlling the operation of the system-on-chip 10. According to an example embodiment, the host CPU 100 may be an application processor (AP).

The secure element 200 may perform an operation related to security of the system-on-chip 10. The secure element 200 may install and execute a security application and may store security data. The secure element 200 may include hardware, software, interfaces, and protocols that provide execution of applications for secure storage, payment, authentication, or other various services. Detailed descriptions of the structure and the operation of the secure element 200 will be given later with reference to FIG. 2.

The peripheral devices 300 may include various devices for operating the system-on-chip 10.

The system-on-chip interconnect 400 may electrically connect devices included in the system-on-chip 10. The system-on-chip interconnect 400 may be used as a data transmission path between the host CPU 100, the secure element 200, peripheral devices 300, the DRAM interface 500 and the NVM controller 600.

The DRAM interface 500 may connect the system-on-chip 10 to the DRAM 20 provided outside the system-on-chip 10. The DRAM interface 500 may manage data transmission between devices included in the system-on-chip 10 and the DRAM 20.

The NVM controller 600 may connect the system-on-chip 10 to the NVM 30 provided outside the system-on-chip 10. The NVM controller 600 may control a read operation and a write operations of the NVM 30 based on commands received from devices included in the system-on-chip 10.

The DRAM 20 and the NVM 30 may be located outside the system-on-chip 10. For example, the DRAM 20 and the NVM 30 may be located external to the system-on-chip 10. The DRAM 20 and the NVM 30 may be arranged outside due to the limited area of the system-on-chip 10 and may be configured to perform operations such as storing data.

The secure NVM 40 may be directly connected to the secure element 200 of the system-on-chip 10. The secure NVM 40 is directly connected to the secure element 200 and may store security data used for the operation of the secure element 200. According to an example embodiment, the secure NVM 40 may not be connected to other devices of the system-on-chip 10 except for the secure element 200.

Figure 2:
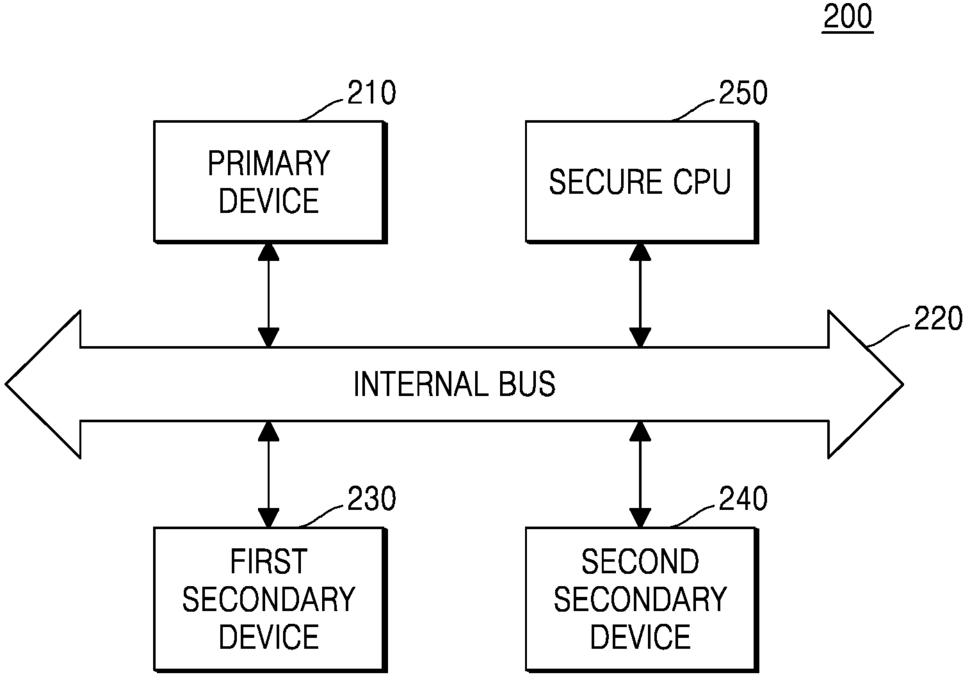
FIG. 2 is a block diagram showing components of a secure element according to an example embodiment.

FIG. 2 is a block diagram showing components of a secure element according to an example embodiment.

Referring to FIG. 2, the secure element 200 according to an example embodiment may include a primary device 210, an internal bus 220, a first secondary device 230, a second secondary device 240, and a secure CPU 250. Although FIG. 2 shows an example embodiment in which the secure element 200 includes one primary device 210 and two secondary devices, that is, the first secondary device 230 and the second secondary device 240, the disclosure is not limited thereto. As such, according to another example embodiment, the secure element 200 may include two or more primary devices or may include one secondary device, or three, or more secondary devices. Although the present embodiment describes primary and secondary devices, the disclosure is not limited thereto, and as such, according to another embodiment, the primary device may be referred to as a first device and the secondary device may be referred to as a second device. According to another embodiment, the primary device may be referred to as a main device and the secondary device may be referred to as an auxiliary device.

The primary device 210, the first secondary device 230, and the second secondary device 240 may include various hardware blocks, software blocks, or combinations thereof operating in the secure element 200. According to an example embodiment, each of the primary device 210, the first secondary device 230, and the second secondary device 240 may each be a software intellectual property (IP) block, a firmware IP block, or a hardware IP block configured to perform a specific function.

The secure CPU 250 may control overall operations of the secure element 200. For example, the secure CPU 250 may read data stored in any one of the DRAM 20, the NVM 30, and the secure NVM 40 and perform an operation corresponding to an internal command of the secure element 200.

The internal bus 220 may interconnect the primary device 210, the first secondary device 230, the second secondary device 240, and the secure CPU 250. The internal bus 220 may be used as a data transmission path between the primary device 210, the first secondary device 230, the second secondary device 240, and the secure CPU 250.

According to an example embodiment, the primary device 210 may transmit encrypted data to the first secondary device 230 or the second secondary device 240. According to an example embodiment, the primary device 210 may transmit the encrypted data to the first secondary device 230 or the second secondary device 240 thorough the internal bus 220. That is, the internal bus 220 may facilitate the transmission of the encrypted data from the primary device 210 to the first secondary device 230 or the second secondary device 240. According to an example embodiment, one of the secondary devices may be selected or set as a secondary device to which the encrypted data is to be transmitted. For example, one of the first secondary device 230 and the second secondary device 240 may be set or selected as the secondary device to which encrypted data is to be transmitted from the primary device 210. According to an example embodiment, one of the secondary devices may be selected or set as a secondary device by the secure CPU 250. However, the disclosure is not limited thereto. According to an example embodiment, the one of the first secondary device 230 and the second secondary device 240 may be set or selected based on an access key received from the secure CPU 250. According to an example embodiment, the internal bus 220 may transmit the encrypted data to the set secondary device among the first secondary device 230 and the second secondary device 240. According to an example embodiment, the internal bus 220 may set a secondary device to which encrypted data is to be transmitted from between the first secondary device 230 and the second secondary device 240 based on an access key received from the secure CPU 250 and transmit encrypted data to a set secondary device by using an error detection tag. Therefore, the first secondary device 230 or the second secondary device 240 may receive encrypted data. The operation of the secure element 200 may be described below in more detail with reference to FIG. 3.

Figure 3:
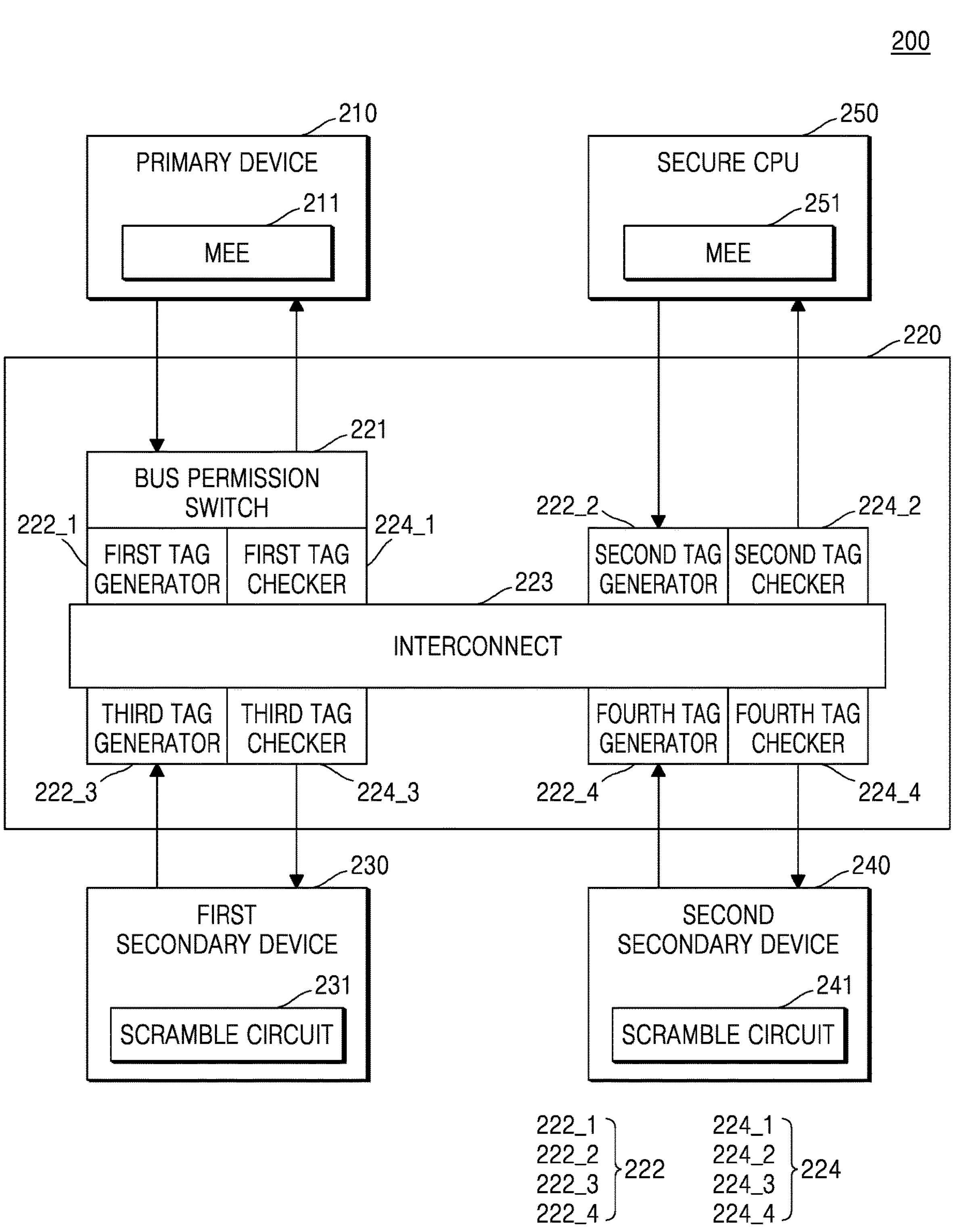
FIG. 3 is a block diagram showing components of a secure element according to an example embodiment in more detail.

FIG. 3 is a block diagram showing components of a secure element according to an example embodiment in more detail.

Referring to FIG. 3, the secure element 200 according to an example embodiment may include the primary device 210, the internal bus 220, the first secondary device 230, the second secondary device 240, and the secure CPU 250.

The primary device 210 may transmit encrypted data to another device through the internal bus 220. Also, the primary device 210 may receive encrypted data from other devices through the internal bus 220. For example, the primary device 210 may transmit encrypted data to one or more of the secondary devices 230, 240 through the internal bus 220, and/or may receive encrypted data from one or more of the secondary devices 230, 240. However, the disclosure is not limited thereto, and as such, the primary device 210 may transmit encrypted data to one or more other devices through the internal bus 220, and/or receive encrypted data from one or more other devices through the internal bus 220.

The primary device 210 may include a memory encryption engine (MEE) 211. The primary device 210 may generate encrypted data by encrypting general data through the MEE 211. Also, the primary device 210 may generate general data by decrypting encrypted data through the MEE 211.

The MEE 211 may receive general data to be transmitted by the primary device 210 to another device. According to an example embodiment, general data may be in the form of plain text. According to an example embodiment, the MEE 211 may receive the data from secure NVM 40. However, the disclosure is not limited thereto, and as such, the MEE 211 may receive the data from another source device. The MEE 211 may generate encrypted data by encrypting received general data. According to an example embodiment, encrypted data may be in the form of cipher text.

Also, the MEE 211 may receive encrypted data transmitted from another device through the internal bus 220. The MEE 211 may generate general data by decrypting received encrypted data.

According to an example embodiment, the MEE 211 may generate encrypted data by encrypting general data by using a dynamic key derived through a combination of a fixed key and a dynamic value.

According to an example embodiment, the MEE 211 may generate encrypted data by encrypting general data based on an encryption algorithm. Also, the MEE 211 may generate general data by decrypting encrypted data based on an encryption algorithm. According to an example embodiment, the encryption algorithm used by the MEE 211 may be, but is not limited to, any one of Advanced Encryption Standard (AES), Data Encryption Standard (DES), Triple DES, SEED, high security and light weight (HIGHT), ARIA, and Lightweight Encryption Algorithm (LEA).

The internal bus 220 may transmit encrypted data received from the primary device 210 to the first secondary device 230 or the second secondary device 240 by using an access key and an error detection tag.

The internal bus 220 may include a bus permission switch 221, a plurality of tag generators 222, an interconnect 223, and a plurality of tag checkers. According to an example embodiment, the plurality of tag generators 222 may include a first tag generator 222_1, a second tag generator 222_2, a third tag generator 222_3, and a fourth tag generator 222_4. According to an example embodiment, the plurality of tag checkers 224 may include a first tag checker 224_1, a second tag checker 224_2, a third tag checker 224_3, and a fourth tag checker 224_4.

The bus permission switch 221 may receive encrypted data transmitted by the primary device 210. The bus permission switch 221 may set a secondary device to which the encrypted data is to be transmitted, based on an access key. According to an example embodiment, the bus permission switch 221 may select a secondary device, among a plurality of secondary devices, to which the encrypted data is to be transmitted, based on an access key. However, the disclosure is not limited thereto, and as such, according to another example embodiment, the bus permission switch 221 may select one or more secondary devices, among a plurality of secondary devices, to which the encrypted data is to be transmitted, based on an access key.

The access key may represent access rights of the primary device 210 for a plurality of secondary devices. For example, the access key may represent access rights of the primary device 210 to access the first secondary device 230 and/or the second secondary device 240. The access key may be a value including several bits and may be managed by the secure CPU 250.

The bus permission switch 221 may determine whether the primary device 210 may access a secondary device to which the encrypted data is to be transmitted, by using the access key. For example, the bus permission switch 221 may use the access key to determine whether the primary device 210 is able to access the secondary device to which the encrypted data is to be transmitted. Thereafter, the bus permission switch 221 may set or select a secondary device to which the encrypted data is to be transmitted according to a result of the determination.

According to an example embodiment, the bus permission switch 221 may select or set a secondary device, among the first secondary device 230 and the second secondary device 240, to receive encrypted data transmitted by the primary device 210 from based on an access key.

The bus permission switch 221 may transmit encrypted data to the first tag generator 222_1.

The first tag generator 222_1 may generate an error detection tag based on encrypted data received from the bus permission switch 221. The error detection tag may be a tag to be attached to encrypted data to determine whether data transmitted through the internal bus 220 is corrupted by an external attack. According to an example embodiment, the error detection tag may include at least one of a parity bit, a Cyclic Redundancy Check (CRC), and an Error Correction Code (ECC). However, the disclosure is not limited thereto, and as such, according to another example embodiment, other error detection techniques may be implemented.

The first tag generator 222_1 may generate an error detection tag based on the type of encrypted data. According to an example embodiment, when the internal bus 220 uses the Advanced Microcontroller Bus Architecture (AMBA) protocol, encrypted data may be transmitted at different timings depending on whether the encrypted data is a bus control signal, read data, or write data. Accordingly, the first tag generator 222_1 may set transmission timings differently according to types of encrypted data and generate an error detection tag according to a set transmission timing.

The first tag generator 222_1 may attach a generated error detection tag to encrypted data received from the primary device 210. The first tag generator 222_1 may transmit encrypted data along with an error detection tag to the interconnect 223. For example, the encrypted data may be attached with an error detection tag, and the first tag generator 222_1 may transmit the encrypted data attached with the error detection tag to the interconnect 223.

The second tag generator 222_2 may generate an error detection tag based on encrypted data received from the secure CPU 250. Also, the second tag generator 222_2 may attach a generated error detection tag to the encrypted data received from the secure CPU 250.

The third tag generator 222_3 may generate an error detection tag based on encrypted data received from the first secondary device 230. The third tag generator 222_3 may attach a generated error detection tag to the encrypted data received from the first secondary device 230.

The fourth tag generator 222_4 may generate an error detection tag based on encrypted data received from the second secondary device 240. The fourth tag generator 222_4 may attach a generated error detection tag to the encrypted data received from the second secondary device 240.

According to an example embodiment, the second tag generator 222_2, the third tag generator 222_3, and the fourth tag generator 222_4 may each generate an error detection tag in a same manner as the first tag generator 222_1.

The interconnect 223 may transmit encrypted data with an error detection tag attached to the encrypted data. According to an example embodiment, the interconnect 223 may receive encrypted data attached with an error detection tag from any one of the plurality of tag generators 222, and transmit the received encrypted data to any one of the plurality of tag checkers 224. For example, the interconnect 223 may receive encrypted data attached with an error detection tag from any one of the first tag generator 222_1, the second tag generator 222_2, the third tag generator 222_3, and the fourth tag generator 222_4, and transmit the received encrypted data attached with an error detection tag to any one of the first tag checker 224_1, the second tag checker 224_2, the third tag checker 224_3, and the fourth tag checker 224_4.

According to an example embodiment, each of the plurality of tag checkers 224, i.e., the first tag checker 224_1, the second tag checker 224_2, the third tag checker 224_3, and the fourth tag checker 224_4, may receive encrypted data attached with an error detection tag from the interconnect 223. For example, any one of the plurality of tag checkers 224 may receive encrypted data attached with an error detection tag from the interconnect 223. The plurality of tag checkers 224 may each determine whether encrypted data attached with an error detection tag is abnormal based on the error detection tag and the encrypted data. The plurality of tag checkers 224 may determine whether the encrypted data is abnormal by using different methods according to types of an error detection tag.

The plurality of tag checkers 224 may each transmit encrypted data to a receiving device when it is determined that there is no abnormality in the encrypted data attached with an error detection tag. For example, each of the first tag checker 224_1, the second tag checker 224_2, the third tag checker 224_3, or the fourth tag checker 224_4 may each transmit encrypted data to a receiving device when it is determined that there is no abnormality in the encrypted data attached with an error detection tag. According to an example embodiment, the first tag checker 224_1 may transmit encrypted data to the primary device 210 when it is determined that there is no abnormality in the encrypted data attached with an error detection tag. The second tag checker 224_2 may transmit encrypted data to the secure CPU 250 when it is determined that there is no abnormality in the encrypted data attached with an error detection tag. The third tag checker 224_3 may transmit encrypted data to the first secondary device 230 when it is determined that there is no abnormality in the encrypted data attached with an error detection tag. The fourth tag checker 224_4 may transmit encrypted data to the second secondary device 240 when it is determined that there is no abnormality in the encrypted data attached with an error detection tag.

Conversely, the plurality of tag checkers 224, i.e., the first tag checker 224_1, the second tag checker 224_2, the third tag checker 224_3, and the fourth tag checker 224_4, may each output an abnormality alarm to the host CPU 100 when it is determined that an error has occurred in encrypted data attached with an error detection tag. As an abnormal alarm is received, the host CPU 100 may perform a countermeasure. According to an example embodiment, the host CPU 100 may stop the operation of the secure element 200.

The first secondary device 230 may receive encrypted data from another device through the internal bus 220. Also, the first secondary device 230 may transmit encrypted data to be transmitted to another device through the internal bus 220.

The first secondary device 230 may include a scramble circuit 231. The first secondary device 230 may set an address to store the received encrypted data, through the scramble circuit 231. According to an example embodiment, the scramble circuit 231 may set an address to store the encrypted data, through address scrambling. Also, the first secondary device 230 may search for an address to store the encrypted data to be transmitted, through the scramble circuit 231.

The second secondary device 240 may receive encrypted data from another device through the internal bus 220. Also, the second secondary device 240 may transmit encrypted data to be transmitted to another device through the internal bus 220.

The second secondary device 240 may include a scramble circuit 241. The second secondary device 240 may set an address to store the received encrypted data, through the scramble circuit 241. According to an example embodiment, the scramble circuit 241 may set an address to store the encrypted data, through address scrambling. Also, the second secondary device 240 may search for an address to store the encrypted data to be transmitted, through scramble circuits 241.

The secure CPU 250 may transmit encrypted data to be transmitted to another device through the internal bus 220. Also, the secure CPU 250 may receive encrypted data from other devices through the internal bus 220.

The secure CPU 250 may include an MEE 251. The secure CPU 250 may generate encrypted data by encrypting general data through the MEE 251. Also, the secure CPU 250 may generate general data by decrypting encrypted data through the MEE 251. According to an example embodiment, the function and the operation of the MEE 251 included in the secure CPU 250 may be same as those of the MEE 211 included in the primary device 210.

According to an example embodiment, the secure CPU 250 may manage access keys. The secure CPU 250 may provide an access key to the bus permission switch 221, thereby enabling the bus permission switch 221 to set a secondary device to which encrypted data is to be transmitted.

By using the system-on-chip 10 including the secure element 200 as described above, the internal bus 220 may transmit an encryption data by using an access key and an error detection tag, thereby improving the security performance of the system-on-chip 10.

Figure 4:
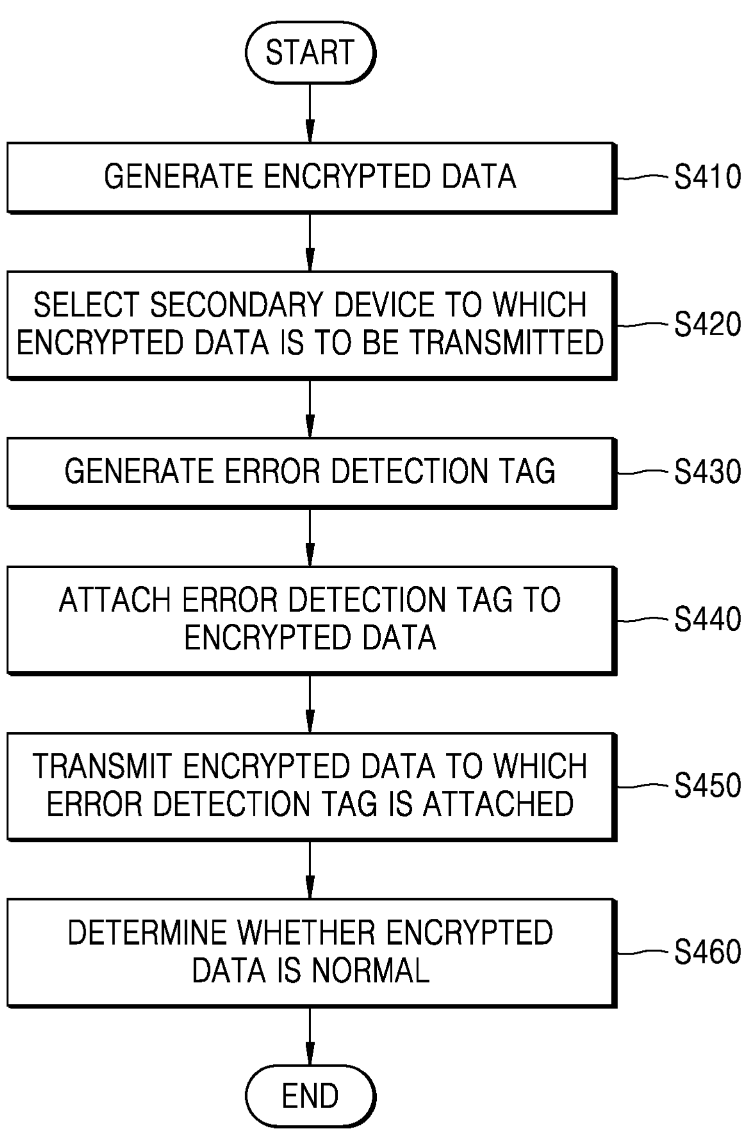
FIG. 4 is a flowchart of a method of operating a secure element according to an example embodiment.

FIG. 4 is a flowchart of a method of operating a secure element according to an example embodiment.

Referring to FIG. 4, in operation S410, the primary device 210 may generate encrypted data through the MEE 211. The MEE 211 may generate encrypted data by encrypting general data. Encrypted data generated by the primary device 210 may be transmitted to the bus permission switch 221 of the internal bus 220.

In operation S420, the internal bus 220 may set a secondary device to which encrypted data is to be transmitted, through the bus permission switch 221. According to an example embodiment, the internal bus 220 may select a secondary device to which encrypted data is to be transmitted, through the bus permission switch 221. For example, the bus permission switch 221 may set or select a secondary device, among a plurality of secondary devices, to which encrypted data is to be transmitted, based on an access key received from the secure CPU 250. According to an example embodiment, the bus permission switch 221 may select one or more secondary devices, among a plurality of secondary devices, to which encrypted data is to be transmitted According to an example embodiment, when the primary device 210 is to transmit encrypted data to the first secondary device 230, the bus permission switch 221 may determine whether the primary device 210 is capable of accessing the first secondary device 230 based on an access key. Also, when it is determined that the primary device 210 is capable of accessing the first secondary device 230, the bus permission switch 221 may set the first secondary device 230 as a secondary device to which encrypted data is to be transmitted.

According to an example embodiment, when it is determined that the primary device 210 is not capable of accessing the first secondary device 230, the bus permission switch 221 may determine whether the primary device 210 is capable of accessing the second secondary device 240 based on an access key, and the bus permission switch 221 may set the second secondary device 240 as a secondary device to which encrypted data is to be transmitted.

After a secondary device to which encrypted data is to be transmitted is set, the bus permission switch 221 may transmit the encrypted data to the first tag generator 222_1.

In operation S430, the internal bus 220 may generate an error detection tag using the first tag generator 222_1. For example, the first tag generator 222_1 may generate an error detection tag based on received encrypted data.

In operation S440, the internal bus 220 may attach an error detection tag to encrypted data using the first tag generator 222_1. For example, the first tag generator 222_1 may attach an error detection tag to encrypted data, and transmit the encrypted data attached with an error detection tag to the interconnect 223.

In operation S450, the internal bus 220 may transmit the encrypted data attached with an error detection tag through the interconnect 223. The interconnect 223 may transmit encrypted data attached with an error detection tag to the third tag checker 224_3, which is a tag checker corresponding to the first secondary device 230 set by the bus permission switch 221 as a secondary device to transmit the encrypted data to.

In operation S460, the internal bus 220 may determine whether encrypted data is abnormal through the third tag checker 224_3. The third tag checker 224_3 may determine whether encrypted data attached with an error detection tag is abnormal based on the error detection tag and the encrypted data. An operation according to a result of the third tag checker 224_3 determining whether encrypted data is abnormal can be described with reference to FIG. 5.

Figure 5:
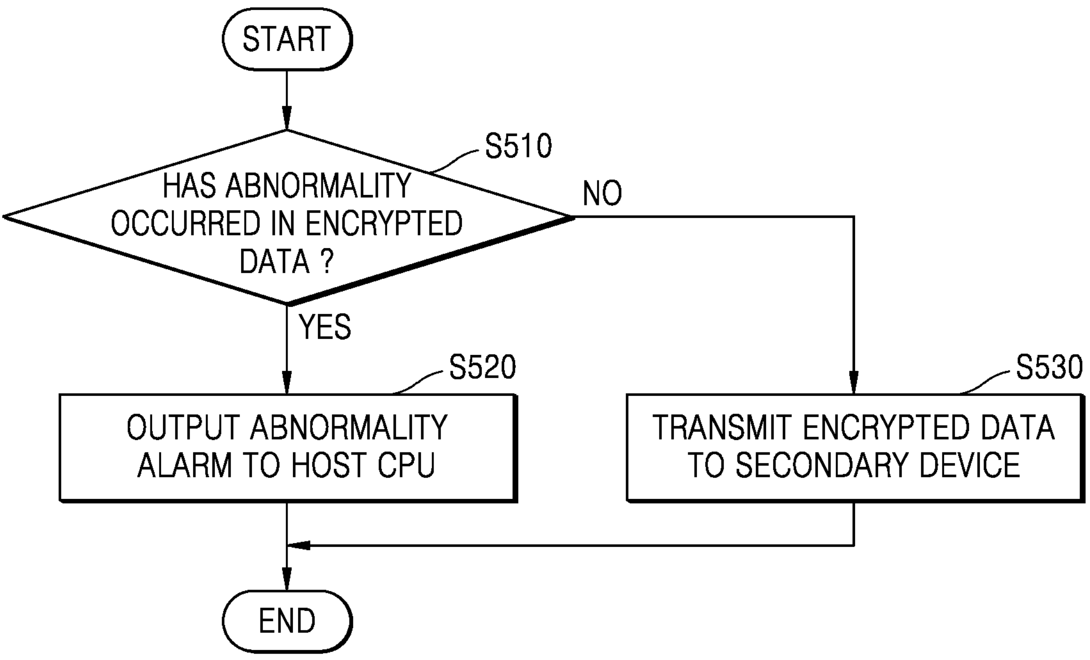
FIG. 5 is a flowchart of an operation method according to whether encrypted data is abnormal in a secure element according to an example embodiment.

FIG. 5 is a flowchart of an operation method for determining whether encrypted data is abnormal in a secure element according to an example embodiment.

Referring to FIG. 5, in operation S510, the internal bus 220 may determine whether an error has occurred in encrypted data using the third tag checker 224_3. For example, the third tag checker 224_3 may determine whether an error has occurred in encrypted data.

According to an example embodiment, when it is determined that an abnormality has occurred in the encrypted data, in operation S520, the internal bus 220 may output an abnormality alarm to the host CPU 100. For example, the third tag checker 224_3 may output an abnormality alarm to the host CPU 100 based on a determination that an error has occurred in encrypted data. Therefore, the host CPU 100 may perform a countermeasure based on the output abnormality alarm. For example, the host CPU 100 may perform a countermeasure, such as stopping the operation of the secure element 200. However, the disclosure is not limited thereto, and as such, other countermeasure operations may be performed by the host CPU 100 or other components of the electronic device in response to the abnormality alarm. In this manner, the security of the system is improved.

On the other hand, when it is determined that there is no abnormality in the encrypted data, in operation S530, the internal bus 220 may transmit the encrypted data to the first secondary device 230 using the third tag checker 224_3. For example, the third tag checker 224_3 may transmit the encrypted data to the first secondary device 230 when it determines that there is no abnormality in the encrypted data.

Figure 6:
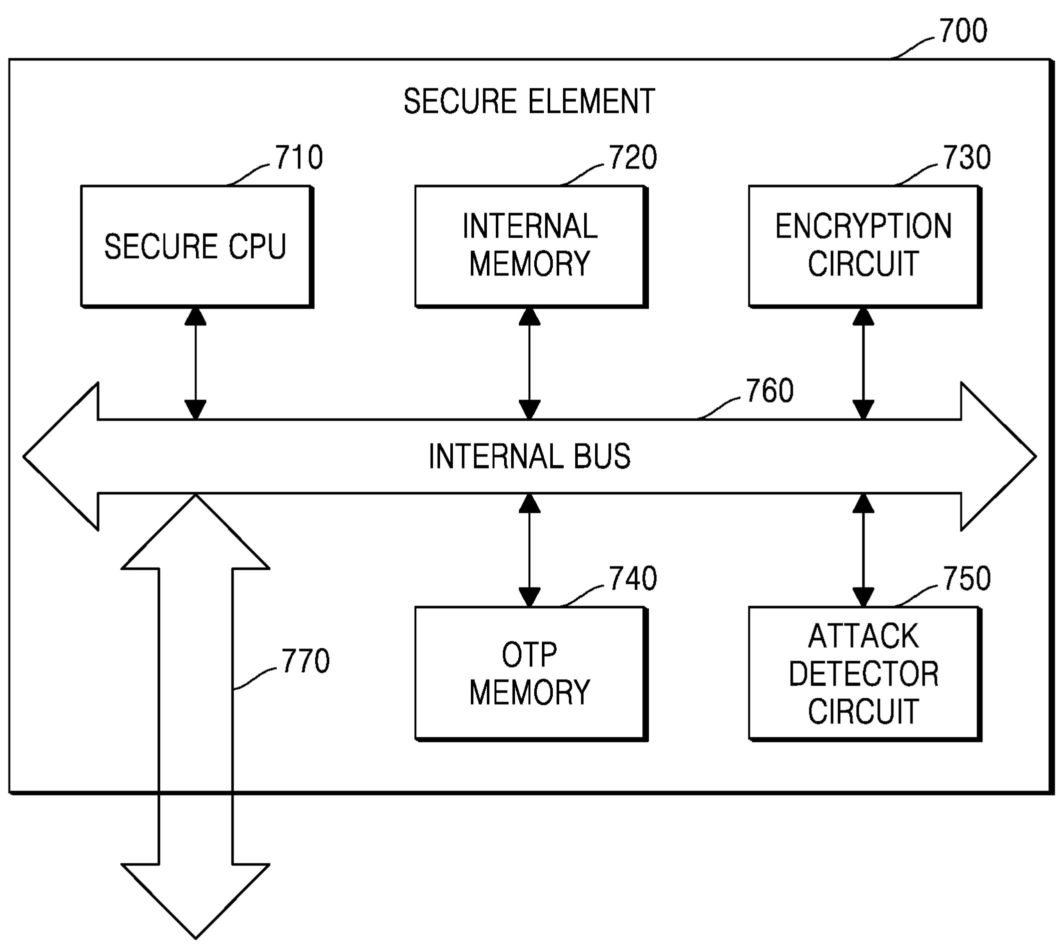
FIG. 6 is a block diagram showing components of a secure element according to an example embodiment.

FIG. 6 is a block diagram showing components of a secure element according to an example embodiment.

Referring to FIG. 6, a secure element 700 according to an example embodiment may include a secure CPU 710, an internal memory 720, an encryption circuit 730, an One Time Programmable (OTP) memory 740, an attack detection circuit 750, an internal bus 760, and an external bus 770.

The secure CPU 710 may control overall operations of the secure element 700. The secure CPU 710 may maintain the security of the secure element 700 by performing countermeasures against security attacks.

The secure CPU 710 may include an MEE. The secure CPU 710 may generate encrypted data by encrypting general data through the MEE. The MEE may generate an encryption key based on an encryption key generated by an encryption circuit 730 described later. The function and the operation of the MEE included in the secure CPU 710 may be the same as those of the MEE 211 included in the primary device 210 according to the embodiment of FIG. 3.

The secure CPU 710 may manage access keys. The secure CPU 710 may provide an access key to the internal bus 760, thereby controlling authorization to access any one of the devices included in the secure element 700 through the internal bus 760.

The internal memory 720 may store encrypted data. The internal memory 720 may include a scramble circuit. The internal memory 720 may set an address to store encrypted data by performing an address scrambling operation through the scramble circuit. Also, the internal memory 720 may search for an address where encrypted data is stored, through the scramble circuit.

The encryption circuit 730 may perform various operations in response to security attacks. For example, the encryption circuit 730 may perform operations including, but not limited to, error detection for Fault Injection Attack (FIA), data masking, key masking, operation current/timing randomization in response to Side Channel Attack (SCA), etc.

The encryption circuit 730 may generate an encryption key used for encryption of general data. The encryption circuit 730 may include a random number generator and an encryption key management circuit.

The random number generator may generate a random number used to generate an encryption key. Random numbers generated through the random number generator may be injected into other devices in the secure element 700 and used for security operations. According to an example embodiment, a random number generated through the random number generator may be injected into a pattern generator 755 of the attack detection circuit 750 to be described later with reference to FIG. 8.

The encryption key management circuit may generate encryption keys based on a random number generated through the random number generator. The encryption key management circuit may generate encryption keys using any one of encryption algorithms, including but not limited to, AES, DES, Triple DES, SEED, HIGHT, ARIA, and LEA. According to an example embodiment, the encryption key management circuit may transmit generated encryption keys to the MEE of the secure CPU 710.

According to an example embodiment, the OTP memory 740 may store one or more encryption keys and a unique identifier (UID). For example, the OTP memory 740 may store at least some of the encryption keys and a unique identifier (UID) used inside the secure element 700. The OTP memory 740 may store at least some of encryption keys and the UID in an encrypted form. The OTP memory 740 may check the integrity of values stored therein through an encryption protocol.

The attack detection circuit 750 may detect whether an external attack on encrypted data has occurred. The attack detection circuit 750 may detect laser attacks, glitch attacks, voltage attacks, temperature attacks, etc. from the outside and may include various types of sensors for detecting such attacks. The structure and the operation of the attack detection circuit 750 will be described later in more detail with reference to FIGS. 7 and 8.

The internal bus 760 may be used as a data transmission path between devices included in the secure element 700. The internal bus 760 may transmit encrypted data inside the secure element 700 using an error detection tag.

The internal bus 760 may include a bus permission switch, a plurality of tag generators, an interconnect, and a plurality of tag checkers as shown in FIG. 3 above. The bus permission switch may select a target to which encrypted data is to be transmitted within the secure element 700, based on an access key. The plurality of tag generators may generate an error detection tag based on the type of encrypted data and attach the error detection tag to the encrypted data. The interconnect may transmit encrypted data attached with an error detection tag. The plurality of tag checkers may determine whether encrypted data attached with an error detection tag is abnormal. When it is determined that there is no abnormality in encrypted data attached with an error detection tag, the plurality of tag checkers may transmit the encrypted data to a target device. When it is determined that an abnormality has occurred in encrypted data attached with an error detection tag, the plurality of tag checkers may output an error alarm to the host CPU 100.

The detailed operation of the internal bus 760 may be the same as that described above with reference to FIGS. 3 to 5.

The external bus 770 may be used as a data transmission path between devices included in the secure element 700 and other devices (e.g., the host CPU 100, the peripheral devices 300, etc.) inside the system-on-chip 10 including the secure element 700. The external bus 770 may transmit encrypted data generated inside the secure element 700 to the outside of the secure element 700. For example, the external bus 770 may transmit encrypted data generated inside the secure element 700 to one or more components or devise external to the secure element 700. Also, the external bus 770 may transmit encrypted data generated outside the secure element 700 to the inside of the secure element 700.

The external bus 770 may detect whether data transmitted from the outside of the secure element 700 is rolled back. In example embodiments, the external bus 770 may include a rollback prevention circuit, and the rollback prevention circuit may be configured to detect whether data transmitted from the outside of the secure element 700 is rolled back. For example, the external bus 770 may detect whether data transmitted from a component or a device external to the secure element 700 is rolled back. The external bus 770 can detect whether data is rolled back by checking a timestamp transmitted along with the data.

According to an example embodiment, the secure element 700 may further include an oscillator. The oscillator may supply an independent system clock to the inside of the secure element 700. Therefore, a security operation inside the secure element 700 may be performed independently of the outside of the secure element 700.

Figure 7:
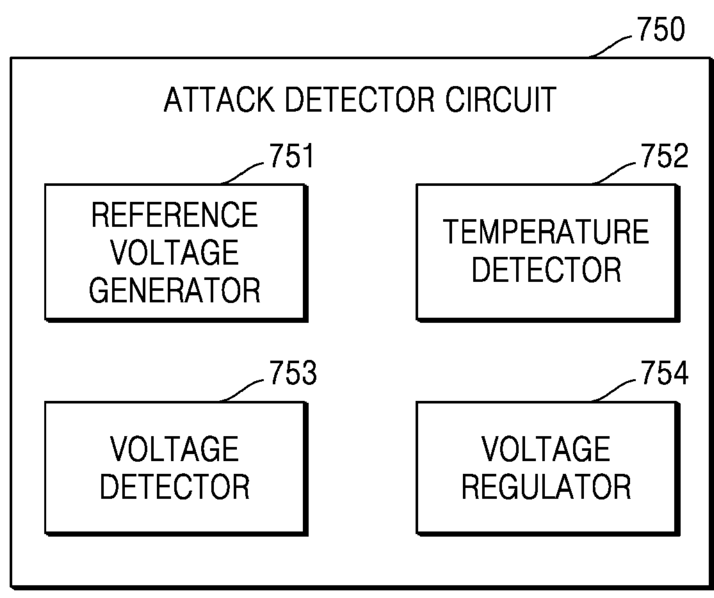
FIG. 7 is a block diagram showing an example of an attack detection circuit of a secure element according to an example embodiment.

FIG. 7 a block diagram showing an example of an attack detection circuit of a secure element according to an example embodiment.

Referring to FIG. 7, the attack detection circuit 750 may include a reference voltage generator 751, a temperature sensor 752, a voltage detector 753, and a voltage regulator 754.

The reference voltage generator 751 may generate a reference voltage. The reference voltage generator 751 may generate a constant reference voltage regardless of the external environment and supply a generated reference voltage to other devices in the attack detection circuit 750.

The temperature sensor 752 may detect an abnormal temperature based on the reference voltage. According to an example embodiment, the temperature sensor 752 may detect an abnormal temperature by determining whether a voltage corresponding to a temperature detected through a temperature sensor is within a normal temperature range calculated based on the reference voltage. The temperature sensor 752 may output an abnormal alarm to the host CPU 100 when an abnormal temperature is detected.

The voltage detector 753 may detect whether an externally supplied voltage is abnormal based on the reference voltage. According to an example embodiment, the voltage detector 753 may detect whether an externally supplied voltage is abnormal by determining whether the externally supplied voltage detected through a voltage sensor is within a normal voltage range calculated based on the reference voltage. Also, the voltage detector 753 may detect whether an externally supplied voltage is abnormal by detecting whether a glitch occurs in the externally supplied voltage detected through the voltage sensor. The voltage detector 753 may output an abnormality alarm to the host CPU 100 when an abnormality in the externally supplied voltage is detected.

The voltage regulator 754 may generate an adjusted voltage used for operation of the secure element 700 based on the reference voltage. Since the adjusted voltage is generated based on the reference voltage having a constant level regardless of the external environment, the adjusted voltage may also have a constant level regardless of the external environment. Therefore, the adjusted voltage may be used for the operation of the secure element 700 that needs to operate normally even under an attack through a change in the external environment. According to an example embodiment, voltage regulator 754 may be a low-dropout (LDO) regulator.

Figure 8:
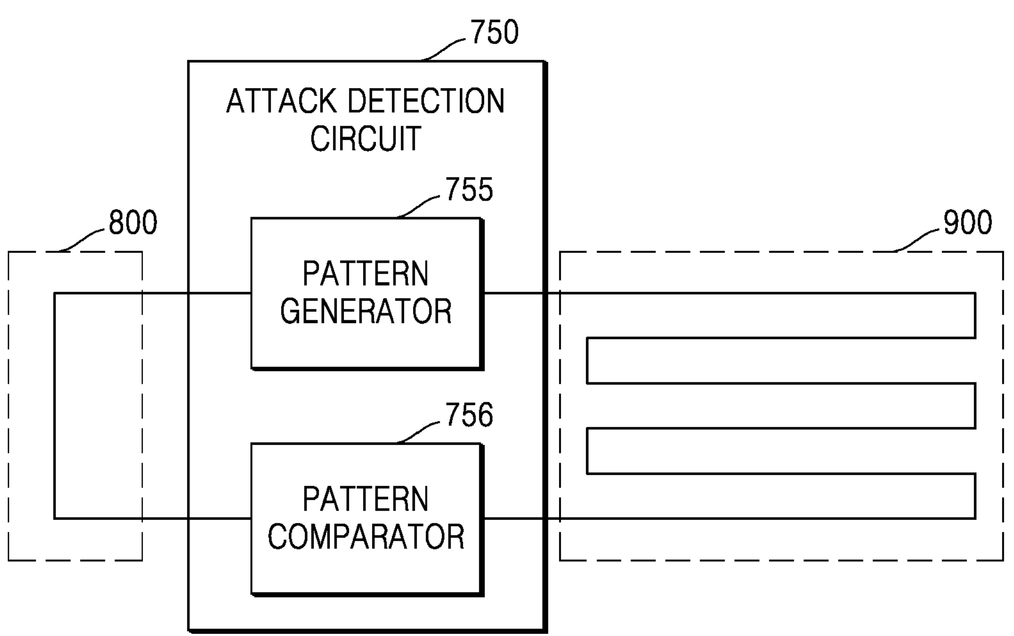
FIG. 8 is a block diagram showing an example of an attack detection circuit of a secure element according to an example embodiment.

FIG. 8 is a block diagram showing an example of an attack detection circuit of a secure element according to an example embodiment.

Referring to FIG. 8, the attack detection circuit 750 may include a pattern generator 755 and a pattern comparator 756.

The pattern generator 755 may generate a random pattern based on a random number generated by the encryption circuit 730. Next, the pattern generator 755 may transmit the random pattern to the pattern comparator 756 through a first layer 800 and a second layer 900.

According to an example embodiment, the first layer 800 may be a lower metal layer covering the lower portion of the system-on-chip 10, and the second layer 900 may be an upper metal layer covering the upper portion of the system-on-chip 10.

The pattern comparator 756 may compare a random pattern received through the first layer 800 and a random pattern received through the second layer 900, thereby determining whether an external attack has occurred. For example, when an external attacker physically removes the first layer 800 or the second layer 900 to detect data inside the system-on-chip 10, a pattern received by the pattern comparator 756 through the first layer 800 and a pattern received by the pattern comparator 756 through the second layer 900 may be different from each other. Therefore, the pattern comparator 756 may compare random patterns transmitted through different paths with each other, thereby detecting a physical security attack on the system-on-chip 10.

When the system-on-chip 10 including the secure element 700 as described above is used, each device included in the secure element 700 performs an operation for enhancing security performance, and thus the security performance of the system-on-chip 10 may be improved. Also, by encrypting and transmitting data in the secure element 700 and detecting whether an external attack on the encrypted data has occurred through the attack detection circuit 750, various types of security attacks on the system-on-chip 10 may be handled.

Figure 9:
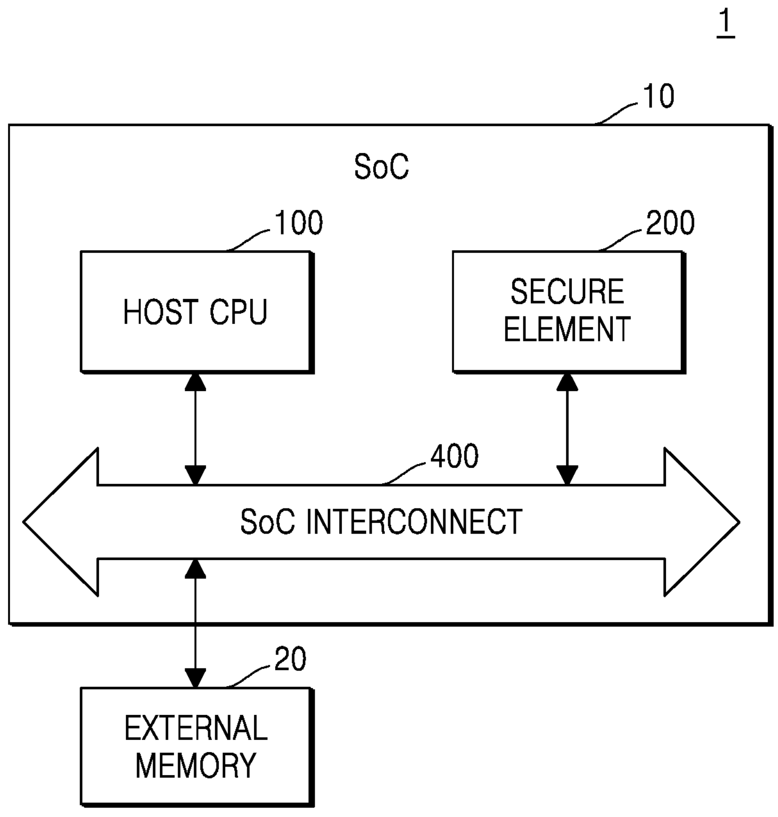
FIG. 9 is a block diagram showing an electronic device including a system-on-chip according to an example embodiment.

FIG. 9 is a block diagram showing an electronic device including a system-on-chip according to an example embodiment.

Referring to FIG. 9, the electronic device 1 may include the system-on-chip 10 and an external memory 20.

The system-on-chip 10 may include the host CPU 100, the secure element 200, and the system-on-chip interconnect 400. Since the host CPU 100, the secure element 200, and the system-on-chip interconnect 400 shown in FIG. 9 perform operations generally similar to those of the host CPU 100, the secure element 200, and the system-on-chip interconnect 400 shown in FIG. 1, descriptions of operations not described above will be given below.

The secure element 200 may transmit encrypted data to the external memory 20. According to an example embodiment, the secure element 200 may generate encrypted data based on general data to be transmitted and an encryption parameter. The operation related to the transmission of encrypted data by the secure element 200 will be described later in more detail with reference to FIG. 10.

The secure element 200 may receive encrypted data from the external memory 20. According to an example embodiment, the secure element 200 may determine whether there is an abnormality in received encrypted data based on the received encrypted data and an encryption parameter. The operation related to the reception of encrypted data by the secure element 200 will be described later in more detail with reference to FIG. 11.

The external memory 20 may be connected to the system-on-chip 10 through the system-on-chip interconnect 400. According to an example embodiment, the external memory 20 may be a DRAM. According to an example embodiment, the external memory 20 may be connected to the system-on-chip interconnect 400 through the DRAM interface 500 shown in FIG. 1.

The external memory 20 may exchange encrypted data with the secure element 200 through the system-on-chip interconnect 400. Also, the external memory 20 may store encrypted data received from the secure element 200. Also, the external memory 20 may transmit stored encrypted data to the secure element 200.

Figure 10:
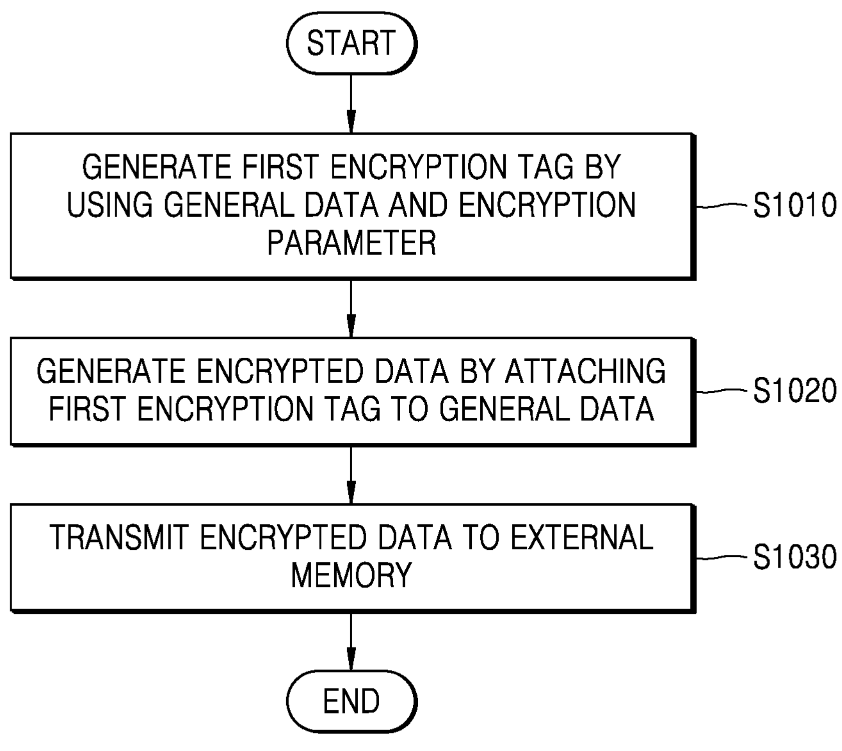
FIG. 10 is a flowchart of an operation method when a system-on-chip transmits data to an external memory according to an example embodiment.

FIG. 10 is a flowchart of an operation method when a system-on-chip transmits data to an external memory according to an example embodiment.

Referring to FIG. 10, in operation S1010, the secure element 200 may generate a first encryption tag by using general data and an encryption parameter. For example, the secure element 200 may generate the first encryption tag based on the general data and the encryption parameter.

According to an example embodiment, the secure element 200 may generate the first encryption tag by using any one of encryption algorithms including, but not limited to, AES, DES, Triple DES, SEED, HIGHT, ARIA, and LEA. The types of encryption algorithm used by the secure element 200 are not limited.

According to an example embodiment, an encryption parameter may be a parameter for verifying the integrity of general data, and may be, for example, any one of a key value, a counter value, a timer value, etc. In this case, the secure element 200 may use the same value as an encryption parameter, but the initial vector value of an encryption parameter may vary every time.

The first encryption tag and an encryption parameter used to generate the first encryption tag may be stored in the secure element 200.

In operation S1020, the secure element 200 may generate encrypted data by attaching the first encryption tag to general data. According to an example embodiment, the secure element 200 may generate encrypted data by attaching the first encryption tag to the front end or the rear end of general data.

In operation S1030, the secure element 200 may transmit encrypted data to the external memory 20. The encrypted data may be transmitted from the secure element 200 to the external memory 20 through the system-on-chip interconnect 400.

When the encrypted data is received from the secure element 200, the external memory 20 may store the encrypted data. According to an example embodiment, the external memory 20 may perform additional encryption on the encrypted data or may store the encrypted data after setting an address where the encrypted data is to be stored, through address scrambling.

Figure 11:
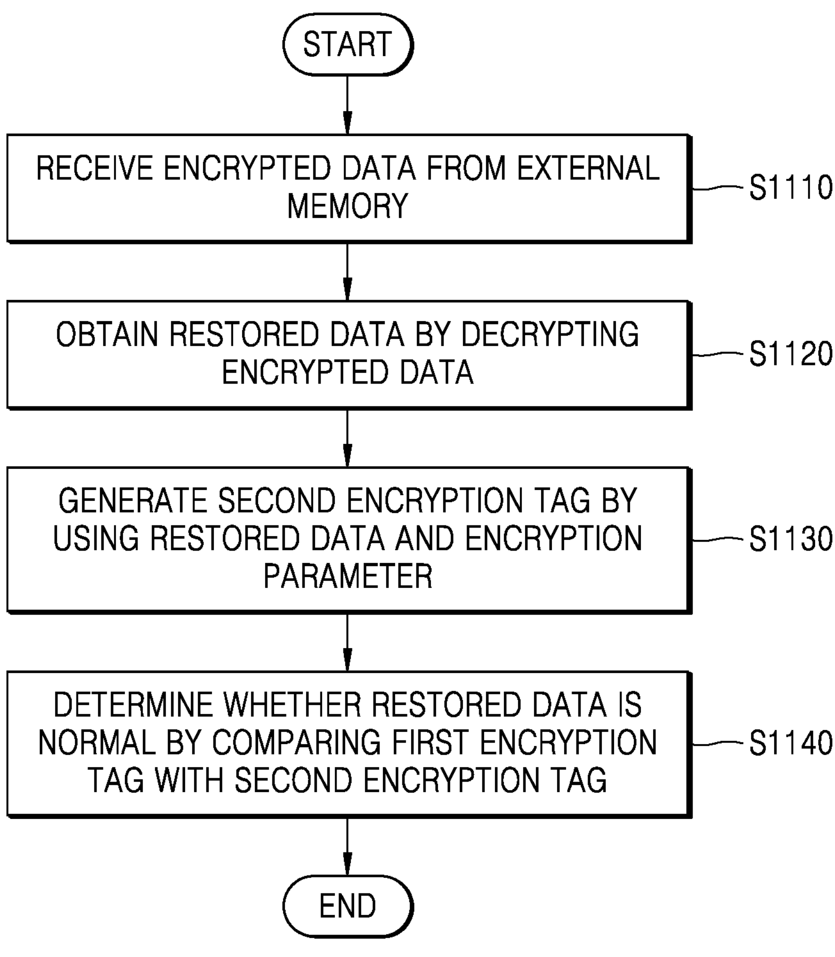
FIG. 11 is a flowchart of an operation method when a system-on-chip receives data from an external memory according to an example embodiment.

FIG. 11 is a flowchart of an operation method when a system-on-chip receives data from an external memory according to an example embodiment.

Referring to FIG. 11, in operation S1110, the secure element 200 may receive encrypted data from the external memory 20. The secure element 200 may receive encrypted data from the external memory 20 through the system-on-chip interconnect 400.

In operation S1120, the secure element 200 may obtain restored data by decrypting the encrypted data. The secure element 200 may obtain restored data by decrypting the encrypted data by using an encryption algorithm and an encryption parameter used in operation S1010 described above.

According to an example embodiment, when there is no abnormality in the encrypted data in the external memory 20, the restored data will be identical to general data. Conversely, when an abnormality occurs in the encrypted data in the external memory 20, restored data will be different from general data.

In operation S1130, the secure element 200 may generate a second encryption tag by using the restored data and an encryption parameter. The secure element 200 may obtain the second encryption tag from the restored data by using the encryption algorithm and the encryption parameter used in operation S1010 described above.

In operation S1140, the secure element 200 may compare the first encryption tag with the second encryption tag to determine whether the restored data is abnormal. According to an example embodiment, the secure element 200 may use a value stored in the secure element 200 after performing the above-described operation S1010 by using the first encryption tag.

When the first encryption tag and the second encryption tag are the same, the secure element 200 may determine that there is no abnormality in the restored data. Since there is no abnormality in the restored data, the secure element 200 may store the restored data in an internal memory.

The secure element 200 may determine that an abnormality has occurred in the restored data when the first encryption tag and the second encryption tag are not the same. Since an abnormality has occurred in restored data, the secure element 200 may output an abnormality alarm to the host CPU 100.

By using the electronic device 1 as described above, the security performance of the system-on-chip 10 may be improved by determining whether encrypted data is abnormal through a first encryption tag and a second encryption tag.

While the disclosure has been particularly shown and described with reference to embodiments thereof, it will be understood that various changes in form and details may be made therein without departing from the spirit and scope of the following claims.

What is claimed is:

1. A system-on-chip comprising:

a host central processing unit (CPU); and a secure element comprising:

a primary device configured to transmit encrypted data through an internal bus, a plurality of secondary devices configured to receive the encrypted data;

a secure CPU configured to manage one or more access keys for accessing the plurality of secondary devices, and the internal bus comprises:

a bus permission switch configured to select, based on an access key, among the one or more access keys, a first secondary device, among the plurality of secondary devices, to which the encrypted data is to be transmitted, an interconnect configured to transmit to the first secondary device the encrypted data and an error detection tag; and a tag checker configured to determine whether the encrypted data attached with the error detection tag is abnormal.

2. The system-on-chip of claim 1, wherein the primary device comprises a memory encryption engine (MEE) configured to generate the encrypted data by encrypting general data.

3. The system-on-chip of claim 1, wherein the internal bus further comprises:

a tag generator configured to generate the error detection tag and attach the error detection tag to the encrypted data.

4. The system-on-chip of claim 3, wherein the tag generator is further configured to generate the error detection tag based on a type of the encrypted data.

5. The system-on-chip of claim 3, wherein the tag checker is further configured to:

transmit the encrypted data to the first secondary device based on a determination that there is no abnormality in the encrypted data attached with the error detection tag, and output an abnormality alarm to the host CPU based on a determination that an abnormality has occurred in the encrypted data attached with the error detection tag.

6. The system-on-chip of claim 5, wherein the host CPU is configured to stop an operation of the secure element based on receiving the abnormality alarm.

7. The system-on-chip of claim 1, wherein the first secondary device comprises a scramble circuit configured to set, based on address scrambling, an address where the encrypted data is to be stored.

8. A system-on-chip comprising:

a host central processing unit (CPU); and a secure element comprising:

an encryption circuit configured to generate encryption keys;

a secure CPU configured to generate encrypted data by encrypting general data using the encryption keys;

an internal memory configured to store the encrypted data;

an one-time programmable (OTP) memory configured to store one or more of the encryption keys and a unique identifier (UID) used in the secure element;

an attack detection circuit configured to detect whether an external attack on the encrypted data has occurred;

an internal bus comprising:

a bus permission switch configured to select, based on an access key, a target device within the secure element to which the encrypted data is to be transmitted, and an interconnect configured to transmit the encrypted data and an error detecting tag within the secure element, and a tag checker configured to determine whether the encrypted data attached with the error detection tag is abnormal; and an external bus configured to transmit the encrypted data outside the secure element to the target device.

9. The system-on-chip of claim 8, wherein the internal bus comprises:

a tag generator configured to generate an error detection tag based on a type of the encrypted data and attach the error detection tag to the encrypted data.

10. The system-on-chip of claim 8, wherein the internal memory comprises:

a scramble circuit configured to set, based on address scrambling, an address where the encrypted data is to be stored.

11. The system-on-chip of claim 8, wherein the encryption circuit comprises:

a random number generator configured to generate random numbers for generating the encryption keys; and an encryption key management circuit configured to generate a first encryption key based on a first random number generated through the random number generator.

12. The system-on-chip of claim 8, wherein the attack detection circuit comprises:

a reference voltage generator configured to generate a reference voltage;

a temperature detector configured to detect an abnormal temperature based on the reference voltage; and a voltage detector configured to detect whether an externally supplied voltage is abnormal based on the reference voltage.

13. The system-on-chip of claim 12, wherein the attack detection circuit further comprises:

a voltage regulator configured to generate an adjusted voltage for an operation of the secure element based on the reference voltage.

14. The system-on-chip of claim 8, wherein the attack detection circuit comprises:

a pattern generator configured to generate a random pattern based on a random number generated by the encryption circuit; and a pattern comparator configured to determine whether the external attack has occurred by comparing a first output of the random pattern received through a first layer and a second output of the random pattern received through a second layer.

15. The system-on-chip of claim 8, wherein the external bus comprises:

a rollback prevention circuit configured to detect whether data transmitted from the outside of the secure element is rolled back.

16. The system-on-chip of claim 8, wherein the secure element further comprises:

an oscillator configured to supply an independent system clock to the secure element.

17. The system-on-chip of claim 8, wherein the encryption circuit is further configured to perform at least one of error detection for Fault Injection Attack (FIA), data masking, key masking, or an operation of current/timing randomization in response to the external attack.

18. An electronic device comprising:

a system-on-chip comprising:

a host central processing unit (CPU), and a secure element comprising an internal bus, the internal bus comprising:

a bus permission switch, an interconnect, and a tag checker; and an external memory configured to communicate encrypted data with the secure element, wherein the secure element is configured to:

generate a first encryption tag based on general data and an encryption parameter, generate the encrypted data by attaching the first encryption tag to the general data, transmit the encrypted data to the external memory, and wherein the external memory is further configured to store the encrypted data, and wherein, based on receiving the encrypted data from the external memory:

the internal bus of the secure element is configured to:

obtain restored data by decrypting the encrypted data, and generate a second encryption tag based on the restored data and the encryption parameter, the bus permission switch is configured to select a destination device to which the received encrypted data is to be transmitted, the interconnect is configured to transmit to the destination device the received encrypted data and the second encryption tag; and the tag checker is configured to determine whether the encrypted data attached with the second encryption tag is abnormal and output an abnormality alarm to the host CPU based on the first encryption tag being different to the second encryption tag.

19. The electronic device of claim 18, wherein, based on receiving the encrypted data from the external memory, the secure element is further configured to:

compare the first encryption tag and the second encryption tag to determine whether the restored data is abnormal.

20. The electronic device of claim 19, wherein the secure element is further configured to:

store the restored data in an internal memory based on the first encryption tag being identical to the second encryption tag.

* * * * *